United States Patent [19]

Wang

[11] Patent Number: 5,602,297
[45] Date of Patent: Feb. 11, 1997

[54] MULTISTAGE DOUBLE CLOSED-LOOP PROCESS FOR WASTE DECONTAMINATION

[76] Inventor: Chi-Shang Wang, 5923 Fairmont, Woodridge, Ill. 60517

[21] Appl. No.: 385,637

[22] Filed: Feb. 8, 1995

[51] Int. Cl.$^6$ .................................................. A62D 3/00
[52] U.S. Cl. .................. 588/207; 588/209; 588/213; 588/900
[58] Field of Search .................................. 588/205, 207, 588/209, 213, 216, 221, 228, 231, 240, 245, 900

[56] References Cited

U.S. PATENT DOCUMENTS

| | | | |
|---|---|---|---|
| 4,303,477 | 12/1981 | Schmidt | 588/213 |
| 4,612,404 | 9/1986 | Thyasarjan | 588/207 |
| 4,782,625 | 11/1988 | Gerkew et al. | 588/209 |
| 4,823,711 | 4/1989 | Kroneberger et al. | 110/236 |
| 5,179,903 | 1/1993 | Abboud et al. | 110/345 |
| 5,200,033 | 4/1993 | Weitzman | 588/209 |
| 5,264,654 | 11/1993 | Kreft et al. | 588/213 |
| 5,393,501 | 2/1995 | Clawson | 588/209 |
| 5,414,205 | 5/1995 | Tischler | 588/209 |

FOREIGN PATENT DOCUMENTS

| | | | |
|---|---|---|---|
| 53-100165 | 9/1978 | Japan | 588/213 |
| 2152949 | 8/1985 | United Kingdom | C10B 49/00 |

Primary Examiner—Gary P. Straub
Attorney, Agent, or Firm—Philip H. Kier

[57] ABSTRACT

A multistage, double closed-loop process and apparatus for organic destruction and removal of volatile organics compounds (VOCs), semi-volatile organic compounds, and halogen acids, removal of toxic metals, and recovery of precious metals and hydrocarbon fuels from gaseous, liquid, and surface-contaminated solid waste streams. Organic destruction of heavy-molecule VOCs is accomplished in a non-combustion thermal reactor by means of thermal energy. Further organic destruction is accomplished by catalytic oxidation. Removing toxic heavy metals or recovering precious metals is accomplished in a bubble-bed reactor in which sub-micron size particles of heavy metals are nucleated, condensed, and deposited onto particles comprising the bed. Acid, particulate, and gas sorbing further remove hazardous substances. Hydrocarbon fuels are recovered by condensing. The process involves high temperature recycling without use of air combustion or incineration to promote a very high degree of decontamination. The process also includes continuous monitoring of levels of carbon monoxide and total hydrocarbons and recycling in a low temperature closed loop thus oxidizing light hydrocarbons and carbon monoxide if these levels are too high for venting.

8 Claims, 4 Drawing Sheets

MULTISTAGE DOUBLE CLOSED-LOOP PROCESS FOR WASTE DECONTAMINATION

BACKGROUND OF THE INVENTION

This invention relates to the treatment of gaseous, liquid, and surface-contaminated hazardous solid waste. In particular, it relates to processes for the organic destruction of volatile organic compounds (VOCs), semi-volatile organic compounds (SVOCs) and removal of VOCs, SVOCs, halogen acids, and toxic heavy metals from waste streams. Integral to the process of this invention is a non-combustion, thermal reactor using thermal energy for destruction of chemical bonds of heavy-molecule VOCs and SVOCs, and a bubble-bed reactor for removing toxic heavy metals and recovering precious metals through nucleation and condensation.

SUMMARY OF THE INVENTION

The invention is an integrated, multiple stage, double closed-loop, waste decontamination process for the treatment of volatile organic compounds, semi-volatile organic compounds, halogen acids, toxic heavy metals, and precious metals. An integral aspect of the process is using heat for the organic destruction of heavy-molecule VOCs, such as polychlorinated biphenyls (PCBs), in a non-combustion thermal reactor, such as the system taught by Kroneberger, et. at. in U.S. Pat. No. 4,823,711, or by this inventor in co-pending application Ser. No. 08/385,632, entitled "Ultra-Pyrolysis Reactor for Hazardous Waste Destruction" and filed contemporaneous. Organic destruction of heavy-molecule VOCs is frequently accomplished in an incinerator system such taught by Abboud, et at., in U.S. Pat. No. 5,179,903 or other device using open flame combustion, which may produce noxious byproducts such as dioxin or nitrogen oxides and may be difficult to permit. Thus, one object of the present invention is to accomplish organic destruction of heavy-molecule VOCs without the production of the noxious byproducts that result from open flame combustion. Incinerators cannot readily be scaled down in size economically to be readily mobile. A non-combustion thermal reactor can be small enough that the entire process apparatus of the present invention can fit in a truck trailer. Thus, another object of the present invention is to have a de. contamination process that can treat large throughputs in a stationary mode or small throughputs in a smaller embodiment that can be readily transported to the site of small-volume hazardous waste generators. Remaining trace amounts of VOCs are removed in subsequent stages through activated carbon adsorption and catalytic oxidation before exhausting to the atmosphere.

Toxic heavy metals are removed and precious metals are recovered in a bubble-bed reactor in which sub-micron sized particles of the heavy metals are nucleated and condensed from their vapor state onto the existing particles that compose the bubble-bed. These particles are preferably 1–200 microns in diameter and are composed of compounds such as aluminum oxides or silicon carbide. Particulates not removed in the bubble-bed reactor are removed subsequently by sorbing. Thus, other objects of the present invention are removal of toxic heavy metals and recovery of precious metals. If the input waste contains halogenated organic compounds, the process also removes halogen acids products of the destruction of the halogenated VOCs through acid sorbing by preferably a calcined limestone bed or by hydrated lime. Thus, another object of the present invention is removing halogen acids.

The process involves two loops, joined at a splitter valve. One loop allows for high-temperature recycling of the waste stream through the decontaminating stages after mixing with new feed. The second loop allows that portion of the waste stream split off for venting to the atmosphere to be recycled for catalytic oxidizing at low temperatures if continuous emission monitoring for carbon monoxide and total hydrocarbons indicate levels exceeding air emission standards, such as performance standards for stationary sources promulgated by the U.S. Environmental Protection Agency. Then a computer that controls the process would cause the two loops to operate as separate closed loops (i.e., venting of exhaust would cease, introduction of new feed would cease, and the two loops would be closed to each other) until air emission standards are again met. This is particularly important for treating acute wastes. Also, important process parameters such as temperatures, pressures, flow rates, and switching functions are continuously monitored and displayed on the computer screen. Thus, a further object of the present invention is to have an integrated hazardous waste decontamination process that will ensure that relevant air emission standards are met.

The process includes heat recovery from heat exchangers. This is an important aspect of the process not only for energy efficiency (e.g., one such heat exchanger transfers heat from the stream leaving the non-combustion thermal reactor at elevated temperatures to preheat the stream at lower temperature entering the non-combustion thermal reactor) but also heat recovery units serve as temperature controls along the process path. Thus, another object of the present invention is to have an integrated hazardous waste decontamination process that uses heat recovery for energy efficient and controllability. The process optionally condenses the vapor stream to remove water and recover useful liquid hydrocarbon fuels. Thus still another object of the present invention is to recover useful hydrocarbon fuels. Also, an internal emergency power source, such as a battery or a petroleum-fueled generator, is installed in event of an external power failure. Because the invention processes hazardous waste it is important to preclude an accidental release of hazardous constituents that might result from a loss of power. Thus another object of the invention is to have an internal emergency power source.

DETAILED DESCRIPTION OF THE PREFERRED EMBODIMENT

Figure 1:
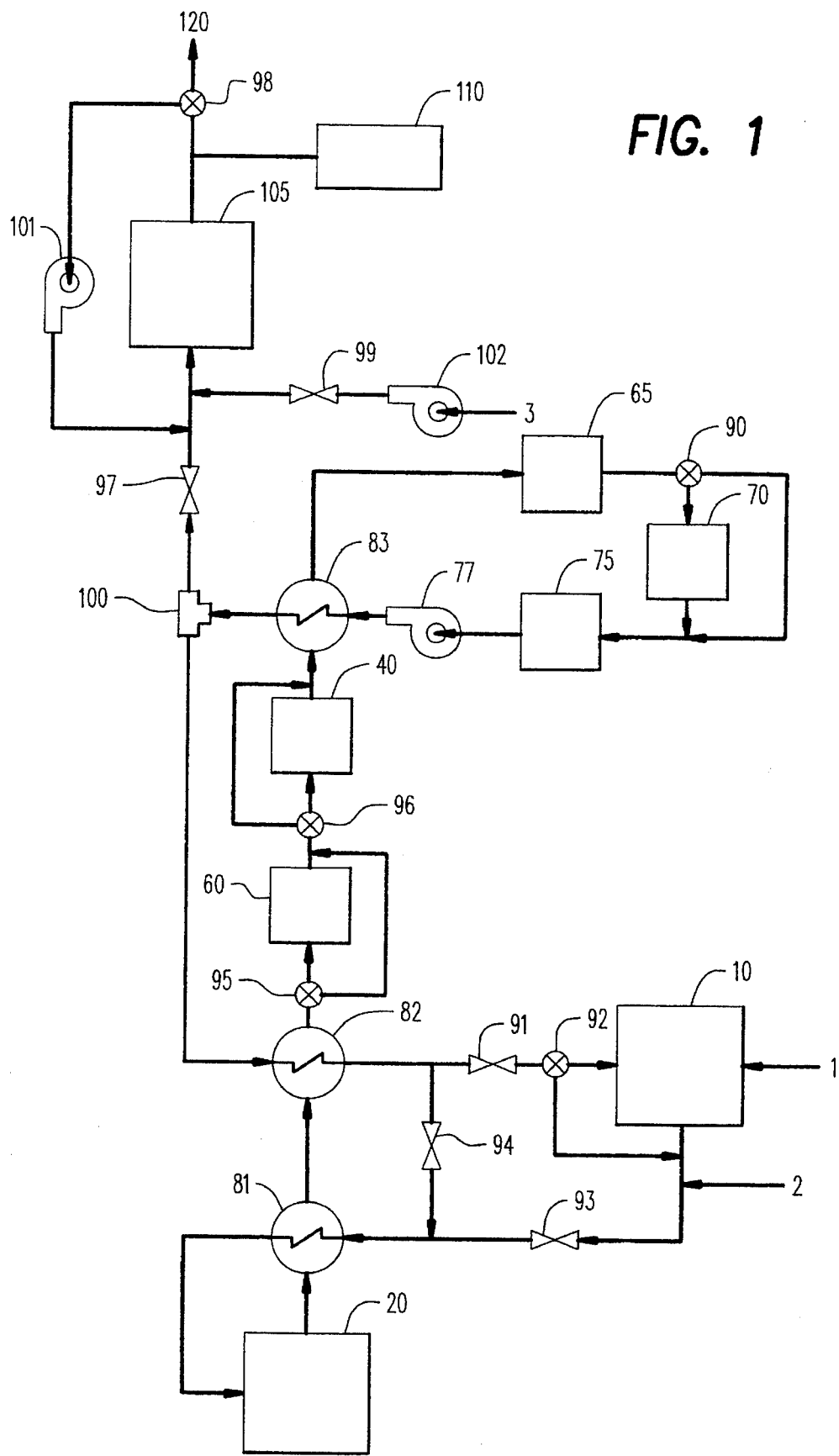
FIG. 1 is a schematic flow diagram of the process when the toxic metals being removed have high condensation temperatures.
Figure 2:
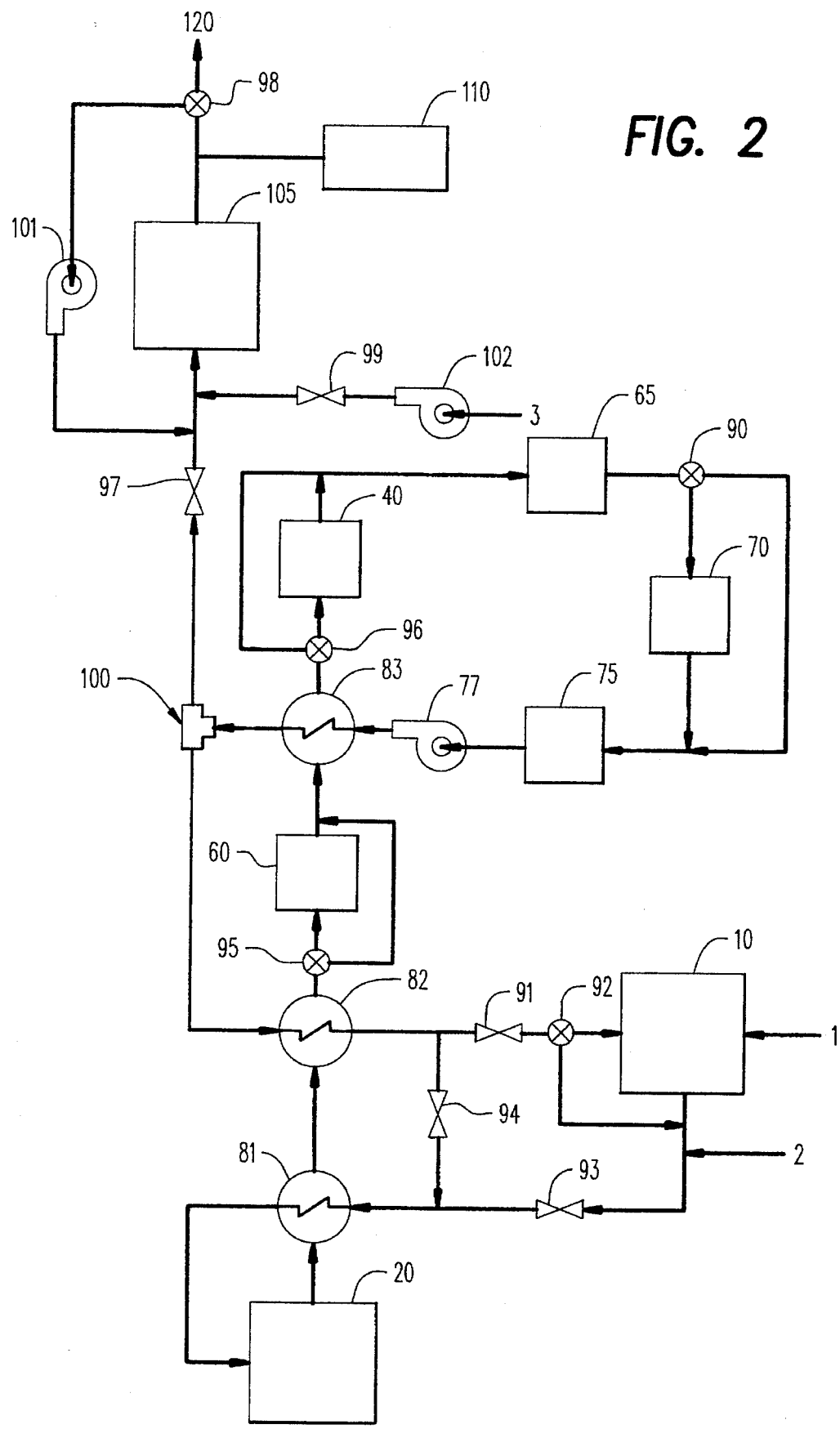
FIG. 2 is a schematic flow diagram of the process when the toxic metals being removed have low condensation temperatures.

FIG. 1 and FIG. 2 illustrate preferred embodiments of the process. Liquid waste feed or surface-contaminated solid waste feed 1 enters the system at the evaporator 10 in which the liquid or surface contamination is vaporized. Gaseous feed 2, waste gas or carrier gas, enters downstream from the evaporator. The carrier gas is non-reacting gas such as carbon dioxide or argon. The vaporized feed then passes through an open valve 93 and is transported to a first heat exchanger 81. This first heat exchanger is a gas-to-gas heat exchanger that raises the temperature of the feed to a temperature (above 800° C.) suitable for entry to a non-combustion thermal reactor 20, which uses heat for organic destruction of heavy-molecule volatile organic compounds (VOCs), such as phenol, and semi-volatile organic compounds such as polychlorinated biphenyls (PCBs) or dioxin. To accomplish this, temperatures up to 1900° C. are required. Light-molecule VOCs, whose chemical bonds are weaker and can effectively be destroyed at lower temperatures, are also destroyed in the non-combustion thermal reactor.

The product stream leaving the non-combustion thermal reactor may contain lower molecule hydrocarbons, acidic gases, carbon dioxide, water vapor, as well as toxic and precious metals and trace amounts of VOCs and SVOCs. It leaves the non-combustion thermal reactor at an elevated temperature and passes through the first heat exchanger 81, where heat is recovered and transferred to the stream entering the non-combustion thermal reactor at a lower temperature. The product stream then passes through a second gas-to-gas heat exchanger 82 where it is cooled further. The product stream leaving the non-combustion thermal reactor has a high temperature, as much as 1300° C. Therefore, the first heat exchanger should be constructed of a material capable of withstanding high temperatures, such as a ceramic material.

If the contaminated waste entering the process contained halogenated organic compounds, then its decomposition in the non-combustion thermal reactor would result in the production of halogen acids such as HCl, HBr, or HF. Then the process would include passing the product stream from the secondary heat exchangers through an acid sorber 60 to neutralize the acidic gases. This acid sorber may be a calcined limestone bed or, if the process needs more steam or oxygen, it can be a hydrated lime bed. If valve 95 is open the vapor stream will enter the acid sorber; if this valve is closed, the acid sorber will be bypassed for those non-halogenated wastes. If the contaminated waste entering the process contains toxic metals or metal compounds, the product stream will then be directed to a second reactor 40 that uses a bubble-bed reactor to remove toxic heavy metals and heavy metal compounds in a vapor state through nucleation, condensation, and deposition. These condensed or deposited metals are pure metals and are no longer toxic. Therefore, the bubble-bed reactor can also be used to recover precious metals in the same way. The second reactor also has catalytic layers for removal of light-molecule VOCs and carbon monoxide through adsorption. If the product steam entering the second reactor contains oxygen, these VOCs and carbon monoxide can also be oxidized. The second reactor, as described below, can be expected to remove at least 99% of the captured heavy metals.

The location of the second reactor 40 depends on the melting temperature of the metals. FIG. 1 shows the placement of the second reactor upstream from a third gas-to-gas heat exchanger 83, for metals or metal compounds (e.g., zinc, lead chloride, magnesium) having a melting temperature in the range 450° C. to 600° C. FIG. 2 shows the placement of the second reactor 40 downstream from the third heat exchanger 83 for metals or metal compounds (e.g., lead, mercury, tin) having a melting temperature in the range 200° C. to 300° C. For product streams that do not contain toxic or precious metals or metal compounds, the second reactor can be bypassed by closing valve 96. Although FIG. 1 and FIG. 2 show systems having three gas-to-gas heat exchangers, a greater or lessor number may be used, depending on the degree of heat recovery needed, the specifications of heat exchangers, and the temperature needs for treatment of a particular hazardous waste. For example, if there is a toxic metal with a melting temperature in the range of 300°–450° C., an additional heat exchanger could be placed between the second reactor 40 and the acid sorber 60, as shown in FIG. 1.

After leaving the second reactor, the product stream is transported to a particulate sorber 65, where the small fraction of condensed heavy metals and other particulates not removed in the second reactor are removed from the product stream and where the temperature of the product stream is typically reduced from 200°–300° C. to about 150° C. If recycle of dry gases or recovery of hydrocarbon fuels is wanted, the product stream is then directed to a condenser 70 where the temperature is reduced to about 95° C. or lower to condense and remove liquids such as water or hydrocarbon fuels from the stream. Dry gas leaving the condenser then passes through an activated carbon bed 75 for gas adsorption of remaining traces of VOCs. If wet gas recycle is required for some particular wastes, such as PCBs, valve 90 is opened and the condenser is bypassed so that the flow is directly from particulate sorber 65 to the gas sorbing activated carbon bed 75. A blower 77 then directs the product stream through the third heat exchanger 93 where the temperature of the vapor stream is raised to approximately 300° C. by means of heat recovery. After leaving the third heat exchanger, the product stream encounters a splitter valve 100, which divides the product stream into two streams, each stream directed toward a loop. One loop contains the components used for the destruction and removal of hazardous wastes described above. The stream from the splitter valve that enters this loop is called the recycle stream. The second loop contains components that help ensure that the gas vented to the atmosphere meets air emission standards for carbon monoxide (CO) and total hydrocarbons (THC). The stream that enters this second loop is called the exhaust stream.

The system has an on-line computer control, the computer typically being a personal computer with a 386 or 486 chip. Valves 91, 93, 94, 97, 98, 99, and the splitter valve 100 are computer controlled. The system has several pressure transducers, thermocouples, and flowmeters located around the system that are all linked to a computer and serve as either controls or diagnostics. For each component in the system, there will be inlet and outlet thermocouples and pressure transducers. For the non-combustion thermal reactor, there will be at least three interior thermocouples along the flow path of the inlet vapor stream. If these instruments detect an imbalance in mass or pressure at the locations of the instruments, or if improper temperatures are detected, the computer control system will adjust the splitter valve to correct the imbalance by changing the fraction of vapor being directed to each loop. An internal power source, such as a battery, provides emergency back-up power in the event external power is lost. This emergency back-up power allows for normal system shutdown, and operational data collection and storage in the event of an external power failure.

The recycle stream is processed through the first closed loop from the splitter valve as follows. Its temperature is raised through heat recovery as it passes through the second heat exchanger 82. After picking up heat from the second heat exchanger, the vapor stream then passes through open valve 91 (valve 94 being closed) to two-way valve 92 for mixing with new waste feed. The recycle stream may serve as (1) carrier gas to pick up the new waste feed and (2) heat transfer agent to deliver heat for evaporating new liquid waste feed. If the feed material is a liquid or surface-contaminated solid, then the recycle vapor stream is directed to the evaporator 10; if the feed material is gaseous, then the mixed recycle/feed stream bypasses the evaporator and is transported directly through open valve 93 to the first heat exchanger 81. If continuous emission monitors 110 detect that air emission standards set by environmental authorities for carbon monoxide and total hydrocarbons will not be met at the moment, valve 97 will be closed and all gas will be directed to the first closed loop by the splitter valve. Also, valve 94 will be open and valves 91 and 93 will be closed to cut off new feed material. In this case, the recycle stream is repeatedly treated again and again until the air emission standards are met.

The exhaust stream directed into the second loop passes through valve 97 to a catalytic oxidizer 105 where carbon monoxide and hydrocarbons are oxidized to form carbon dioxide and water vapor. Before entering the catalytic oxidizer, the exhaust stream will be mixed with air 3 propelled by blower 102 and entering through valve 99. The oxidized exhaust/air stream leaving the catalytic oxidizer is checked continuously for carbon monoxide and total hydrocarbons content by carbon monoxide and total hydrocarbon monitors 110. If the oxidized exhaust/air stream meet air emission standards, two-way valve 98 is open to a vent 120 and the stream is vented. If the oxidized exhaust/air stream does not meet air emission standards, two-way valve 98 will direct the stream to a blower 101 rather than to the vent so that the exhaust will be further recycled through the second closed loop for further oxidation until the air emission standards are met. The operations of blowers 101 and 102 are also controlled by the computer; their being open or closed depend on the readings of the carbon monoxide and total hydrocarbon monitors.

Figure 3:
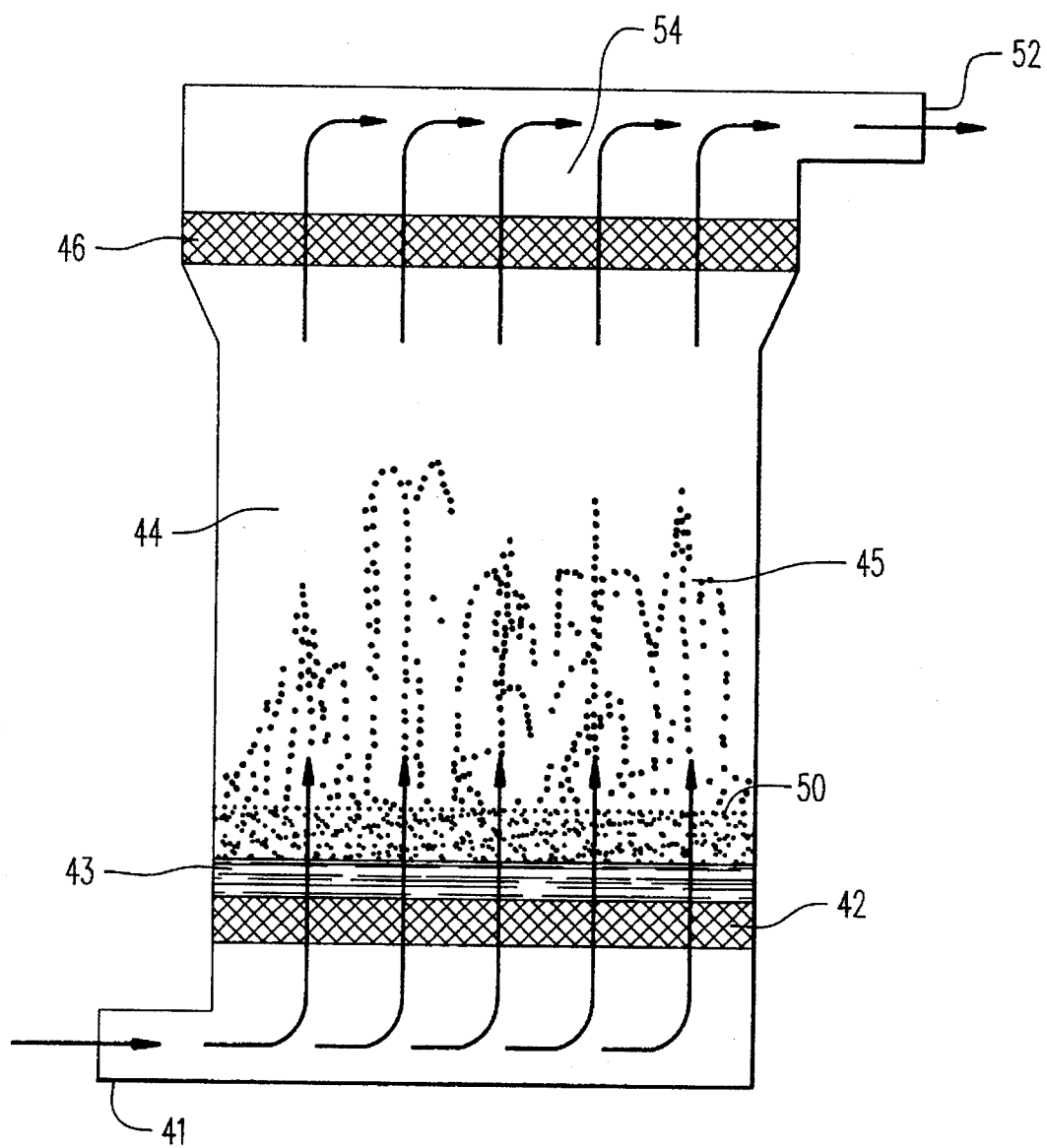
FIG. 3 is a sectional view of the bubble-bed reactor with two catalytic layers.
Figure 4:
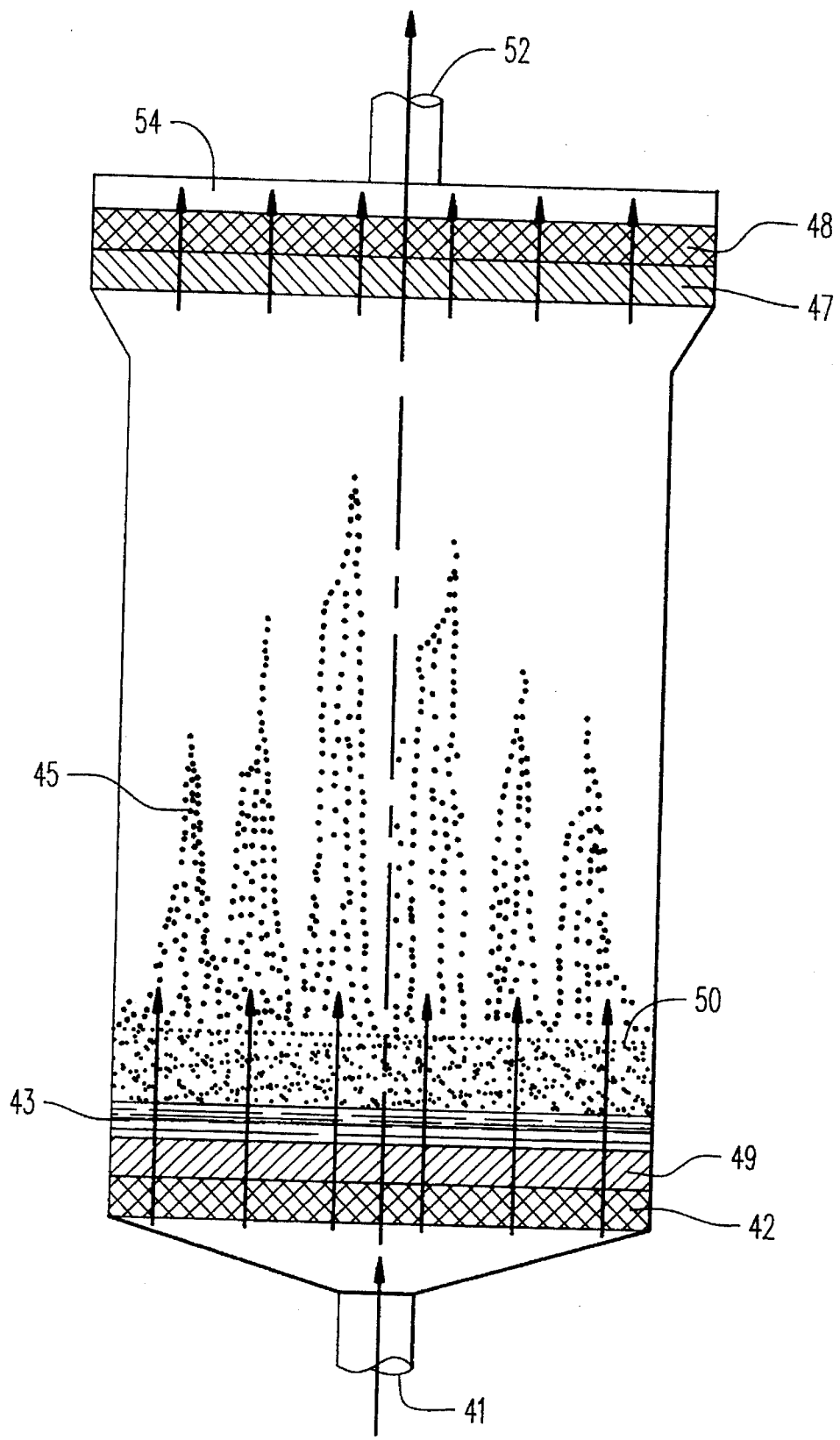
FIG. 4 is a sectional view of the bubble-bed reactor with four catalytic layers.

Preferred embodiments of the second reactor 40 are shown in FIG. 3 and FIG. 4. The second reactor preferably contains a bubble-bed reactor and is used primarily to remove toxic heavy metals such as lead, cadmium, nickel, and their compounds, or to recover precious metals, such as gold. Also, it contains catalytic layers to remove light-molecule halogenated VOCs, non-halogenated VOCs and carbon monoxide through absorption or adsorption. If the system contains oxygen from the input wastes, VOCs and carbon monoxide can be oxidized to form water vapor and carbon dioxide. The VOCs removed by the catalytic layers have light molecules, such as methane, and can be decomposed in the relatively low temperatures of the second reactor. A product stream at temperatures above the condensation temperature of the toxic or precious metal enters through an inlet 41 at the bottom of the second reactor. The product stream then passes through a first catalytic layer 42. If the product stream contains halogenated VOCs, they should be removed by the first catalytic layer to avoid poisoning subsequent catalytic layers, that can remove non-halogenated VOCs, carbon monoxide, and nitrogen oxides (NOD, if any.

The stream then passes through a porous layer 43 to help distribute the input gases uniformly. Then the waste vapors enter a fluidized-bed chamber. The bed preferably consists of particles with diameters in the range of microns to hundreds of microns (e.g., 1–200 microns). These particles can be calcined lime stones, hydrated lime, aluminum oxides, silicon carbide, silicon dioxide, singly or in combination. If calcined limestone or hydrated lime is bed material, then halogen acids can also be removed. The flow of the waste vapors through the bed causes the bed particles to rise above the initial bed height 50 and to exhibit a hydrodynamic "bubbling" behavior 45 that facilitates nucleation, condensation, deposition, and agglomeration of the metals or metal compounds from their vapor state. Thus the heavy-metal vapors will be homogeneously nucleated as very tiny sub-micron particles or heterogeneously condensed and deposited on the bed particles or the walls of the fluidized-bed chamber 44 as the temperature of the heavy metal vapor falls below the dew point or saturation point. In the embodiment illustrated in FIG. 3, there is a second catalytic layer 46, above the fluidized-bed chamber. In the embodiment shown in FIG. 4, there are four catalytic layers. The second catalytic layer 49 is between the first catalytic layer 42 and the porous distributer layer 43. A third catalytic layer 47 and a fourth catalytic layer 48 are above the fluidized-bed chamber. Each of the catalytic layers may be made of a different material and be used to remove a different type of poison or toxic gas. Although FIG. 3 and FIG. 4 show systems having two catalytic layers and four catalytic layers, respectively, a greater or lessor number of catalytic layers may be used, depending on the degree of removal needed and type of poison or toxic gases present in the stream. The second reactor can be designed so that a catalytic layer can readily be changed or replaced, as the waste being treated changes or when it becomes saturated. The catalytic layers could sit on brackets so that they could be easily slid into place. Such catalytic layers are commercially available. Before entering the outlet 52 of the bubble-bed reactor, the vapor stream enters an expansion chamber 54 to lower its temperature and pressure. The catalytic layers above the fluidized bed chamber also serve as particulate filters for returning particles back to the chamber. Catalytic oxidizer 105 contains catalytic layers similar to those in the second reactor described above.

The process of the present invention has been used in a series of laboratory tests to decompose a wide variety of principal hazardous organic constituents (PHOCs). The destruction and removal efficiencies (DREs) of the tests are summarized in the table below. These destruction and removal efficiencies exceed the performance standards for incinerators (99.99%) promulgated by the U.S. Environmental Protection Agency in the Code of Federal Regulations (see 40 CFR 264.343(a)(1), Jul. 1, 1993 edition).

| PHOC | Reactor Temp, °C. | Feed (ppb)* | Exhaust (ppb) | Detection Limit, ppb | Destruction & Removal[+] Efficiency % |
|---|---|---|---|---|---|
| Benzene | 1200 | 32,119 | <0.10 (ND)** | 0.10 | >99.99969 |
| Carbon Tetrachloride | 1200 | 57,917 | 0.23 | 0.10 | 99.99969 |
| Chlorobenezene | 1200 | 40,378 | <0.10 (ND) | 0.10 | >99.99975 |
| Chloroform | 1200 | 54,080 | 0.25 | 0.10 | 99.99954 |

-continued

| PHOC | Reactor Temp, °C. | Feed (ppb)* | Exhaust (ppb) | Detection Limit, ppb | Destruction & Removal[+] Efficiency % |
|---|---|---|---|---|---|
| Dichloroethylene | 1200 | 48,782 | <0.5 (ND) | 0.50 | >99.99898 |
| Hexachlorobenzene | 1400 | 121,803 | <5.0 (ND) | 5.00 | >99.99590 |
| Tetrachloroethylene | 1200 | 59,379 | <0.10 (ND) | 0.10 | >99.99983 |
| Toluene | 1200 | 31,644 | <0.10 (ND) | 0.10 | >99.99968 |
| Trichloroethylene | 1200 | 53,350 | <0.10 (ND) | 0.10 | >99.99981 |
| Xylene | 1200 | 31,465 | <0.10 (ND) | 0.10 | >99.99968 |

[+]For those compounds not detected in the exhaust, the detection limit was used as exhaust concentration for the calculation of destruction and removal efficiency.
*ppb means parts per billion
**ND means not detected

I claim:

1. A process for the decontamination of contaminated liquid waste and solid waste having surface contamination, said waste containing, halogenated volatile organic compounds, non-halogenated volatile organic compounds, hydrocarbons, toxic metals, precious metals, particulates, the process comprising:

evaporating said contaminants in an evaporator;

passing the resulting vapor stream from the evaporator to a first heat exchanger where it is heated;

passing the resulting vapor stream from the first heat exchanger to a non-combustion thermal reactor, destroying chemical bonds of volatile organic compounds in the vapor stream passed to the non-combustion thermal reactor by means of heating, and producing hydrocarbons, water vapor, carbon dioxide, carbon monoxide, and when the destroyed chemical bonds are of halogenated volatile organic compounds, also producing halogen acids;

passing the resulting heated vapor stream from the non-combustion thermal reactor to the first heat exchanger where it is cooled;

passing the resulting cooled vapor stream from the first heat exchanger to a plurality of secondary heat exchangers where it is further cooled;

passing the resulting further cooled vapor stream from the plurality of secondary heat exchangers to a first sorber and removing the halogen acids produced in destroying the chemical bonds of halogenated volatile organic compounds produced in the non-combustion thermal reactor by sorbing;

passing the resulting vapor stream from the first sorber to a second reactor with a fluidized bed section, catalytic layers, and an expansion chamber and removing toxic metals and recovering precious metals by means of nucleation, condensation, deposition, and agglomeration in the fluidized bed section, removing volatile organic compounds, semi-volatile organic compounds, and carbon monoxide by adsorption and absorption in the catalytic layers, and lowering the temperature and pressure of the vapor stream passed from the fluidized bed section and catalytic layers in the expansion chamber;

passing the resulting stream from the second reactor to a second sorber and removing particulates through sorbing;

passing the resulting stream from the second sorber to a third sorber and removing remaining volatile organic compounds through gas adsorption, passing the resulting stream from the third sorber to a blower, and passing the stream from the blower to a splitter valve where the stream from the blower is split into a recycle stream and an exhaust stream;

passing the recycle stream to the secondary heat exchangers, heating it in the secondary heat exchangers, mixing the heated recycle stream with the vapor stream passed from the evaporator, preheating the mixture of heated recycle stream and vapor stream from the evaporator in the first heat exchanger, and destroying the organic bonds of volatile organic compounds in the mixture in non-combustion thermal reactor;

mixing the exhaust stream with air and passing the mixed air exhaust stream to a catalytic oxidizer and oxidizing volatile organic compounds, carbon monoxide, and hydrocarbons in the mixed air exhaust stream;

passing the mixed air exhaust stream from the catalytic oxidizer to monitoring equipment, continuously monitoring the mixed air exhaust stream from the catalytic oxidizer for carbon monoxide and total hydrocarbon content and either venting the monitored mixed air exhaust stream, or recycling the monitored mixed exhaust stream to further oxidize volatile organic compounds, carbon monoxide, and hydrocarbons in the catalytic oxidizer passing all of the further oxidized mixed air exhaust stream into the recycle stream, while closing off the evaporator from fresh waste feed;

measuring inlet and outlet temperatures, pressures, and flows at the first exchanger, secondary heat exchangers, non-combustion thermal reactor, first sorber, second reactor, particulate sorber, and catalytic oxidizer with thermocouples, pressure transducers, and flowmeters; and controlling the flows, pressures, and temperatures by means of diagnostic indicators and controlling equipment linked to a computer.

2. A process as set forth in claim 1 further comprising mixing the resulting vapor stream from the evaporator with carrier gas, contaminated gaseous waste, or both, and passing the resulting mixture to the first heat exchanger.

3. A process as set forth in claim 2 further comprising providing emergency back-up power by means of an internal power source.

4. A process for the decontamination of contaminated liquid and gaseous waste and solid waste having surface contamination as set forth in claim 3 wherein the second reactor is a bubble-bed reactor comprising:

a plurality of catalytic layers to absorb or adsorb halogenated volatile organic compounds, non-halogenated volatile organic compounds, and carbon monoxide;

a fluidized bed having bed particles with diameters that can be in a range from microns to several hundred microns, said bed particles being calcined lime stones, hydrated lime, aluminum oxides, silicon carbide, silicon dioxide, or some combination thereof;

a porous layer positioned between one or more of said catalytic layers to distribute uniformly a vapor stream that has passed through the catalytic oxidizing layers for entry to said fluidized bed; and an expansion chamber.

5. A process as set forth in claim 4 further comprising:

passing the resulting stream from the second sorber to a condenser and removing and recovering condensed liquids from the condenser; and passing the resulting stream from the condenser to the third sorber.

6. A process as set forth in claim 5 further comprising passing the resulting stream from the blower to a secondary heat exchanger, heating it in the secondary heat exchanger, and passing the heated stream from the secondary heat exchanger to the splitter valve.

7. A process as set forth in claim 5 further comprising passing the stream resulting from the second reactor to a tertiary heat exchanger, cooling it in the tertiary heat exchanger, and passing the cooled stream from the tertiary heat exchanger to the second sorber.

8. A process as set forth in claim 7 further comprising passing the resulting stream from the blower to the tertiary heat exchanger, heating it in the tertiary heat exchanger, and passing the heated stream from the tertiary heat exchanger to the splitter valve.

* * * * *